(No Model.) 7 Sheets—Sheet 1.

J. F. APPLEBY.
HARVESTER.

No. 567,933. Patented Sept. 15, 1896.

(No Model.) 7 Sheets—Sheet 4.

J. F. APPLEBY.
HARVESTER.

No. 567,933. Patented Sept. 15, 1896.

(No Model.) 7 Sheets—Sheet 6.

J. F. APPLEBY.
HARVESTER.

No. 567,933. Patented Sept. 15, 1896.

Witnesses,
Inventor,
John F. Appleby

UNITED STATES PATENT OFFICE.

JOHN F. APPLEBY, OF CHICAGO, ILLINOIS, ASSIGNOR, BY MESNE ASSIGNMENTS, TO THE HARVESTER KING COMPANY, OF HARVEY, ILLINOIS.

HARVESTER.

SPECIFICATION forming part of Letters Patent No. 567,933, dated September 15, 1896.

Application filed May 3, 1894. Serial No. 509,938. (No model.)

*To all whom it may concern:*

Be it known that I, JOHN F. APPLEBY, of Chicago, Illinois, have invented certain new and useful Improvements in Harvesters, of which the following is a specification.

This invention relates to certain improvements in harvesters, and more particularly to certain improvements in a harvesting-machine of the type wherein the machine is propelled in front of the draft-animals, as in headers, instead of being provided with a forwardly-projecting tongue to which the draft-animals are attached, as in the common form of machine. In machines of the header type the grain-platform and its accessories are carried in front of the axle and provision must be made for varying the elevation of the platform, so as to vary the height of stubble. Heretofore, so far as I am aware, no one has successfully applied a self-binding mechanism to a machine of this type, the weight of the binder, superadded to the grain-platform, reel, and other accessories, rendering proper support a difficult problem. I have overcome these difficulties by certain novel constructions of the frame and the provision of certain novel features for counterbalancing the weight of the platform with the binder and other accessories mounted thereon.

My invention consists in the novel devices, combinations of devices, and structural details hereinafter described, and particularly pointed out in the claims.

In the accompanying drawings, Fig. 1ᵃ is a plan partly broken away.

Figures 4, 6:
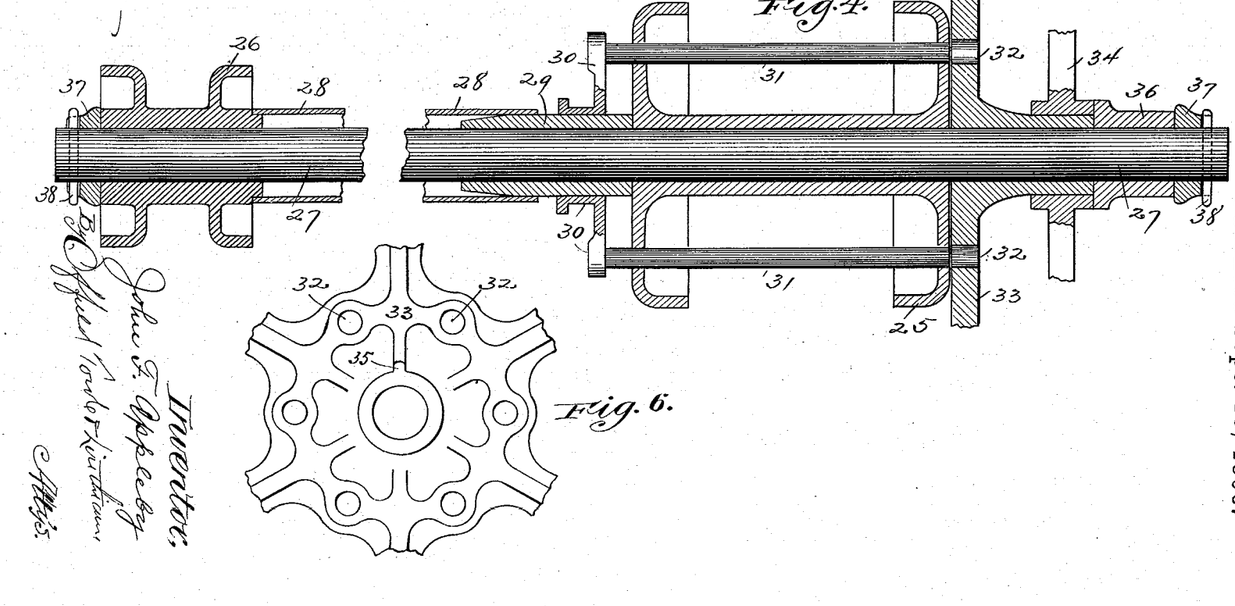
Fig. 4 is a sectional plan view of the axle and of some of the parts mounted thereon, the view being partly broken away.
Fig. 6 is a broken detail in elevation of the outer face of the drive-wheel hub.
Figure 5:
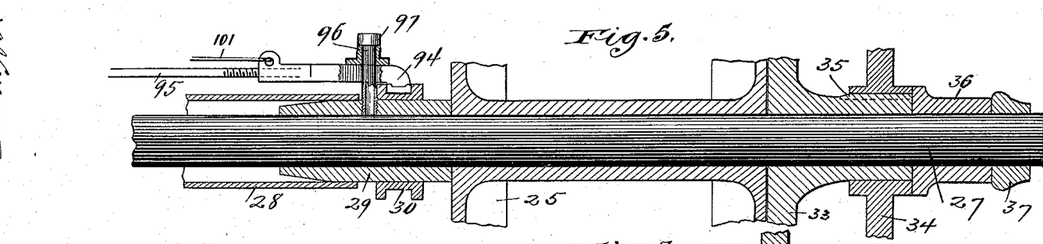
Fig. 5 is an elevation, partly in section, showing the axle at the driving-wheel end.

The frame of the machine is preferably constructed of steel in order to secure lightness and strength, and the machine is carried upon the ground-wheels 25 26, the former being the driver. The axle 27 is a steel shaft, which serves to connect the ground-wheels and to form a bearing for other parts, and, as shown, is not connected with any of the parts, and therefore does not necessarily revolve. The hubs of the ground-wheels are bored for the passage of the axle, and a tubular beam 28 is sleeved over the axle, one of its ends having a bearing on the hub of the ground-wheel 26, as seen in Fig. 4, and its opposite end having a bearing on the short sleeve 29, whose end abuts against the hub of the driver 25. A clutch mechanism is also mounted concentric to the axle and comprises a clutch-hub 30, which is mounted to slide on the sleeve 29 and carries bolts 31, which extend through apertures in the hub of the driver, parallel to the axle, and which are adapted to enter apertures 32 in the main driving-gear 33. A broken detail of this gear is shown in Fig. 6, six of the apertures being shown arranged concentric to the axle, while only two of the bolts are shown, these being sufficient to distribute the strain. A driving-gear 34 is secured on the hub of the gear 33 by means of a rib 35, as shown in dotted lines in Fig. 5. A sleeve 36 abuts against the outer end of the hubs of the gears 33 and 34, and all of the parts above described are held against lateral movement on the axle by their abutment against each other and by the collars or washers 37 and pins 38.

From the foregoing description it will be seen that the carrying-wheels, the clutch mechanism, and the tubular beam (to which the platform is connected) may all turn freely about the axle, thus enabling the platform to be tilted.

Figure 1:
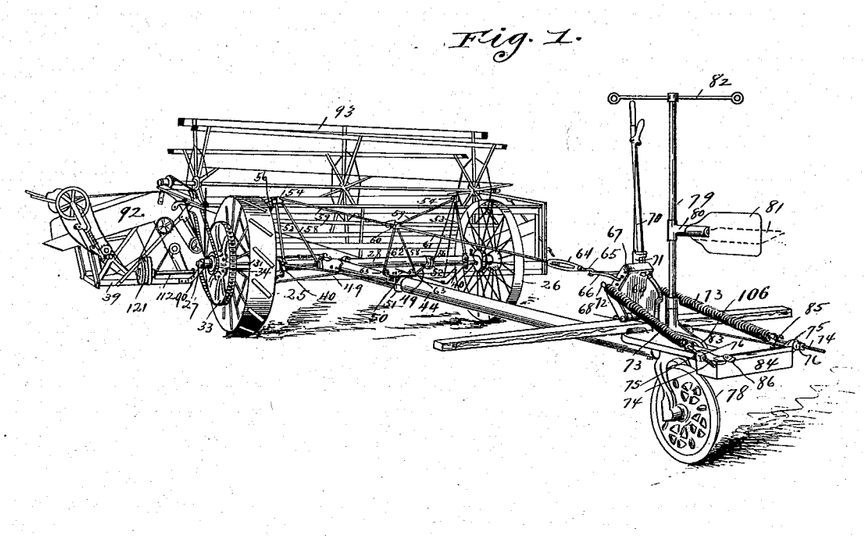
Figure 1 is a perspective view of the machine from the rear.
Figure 2:
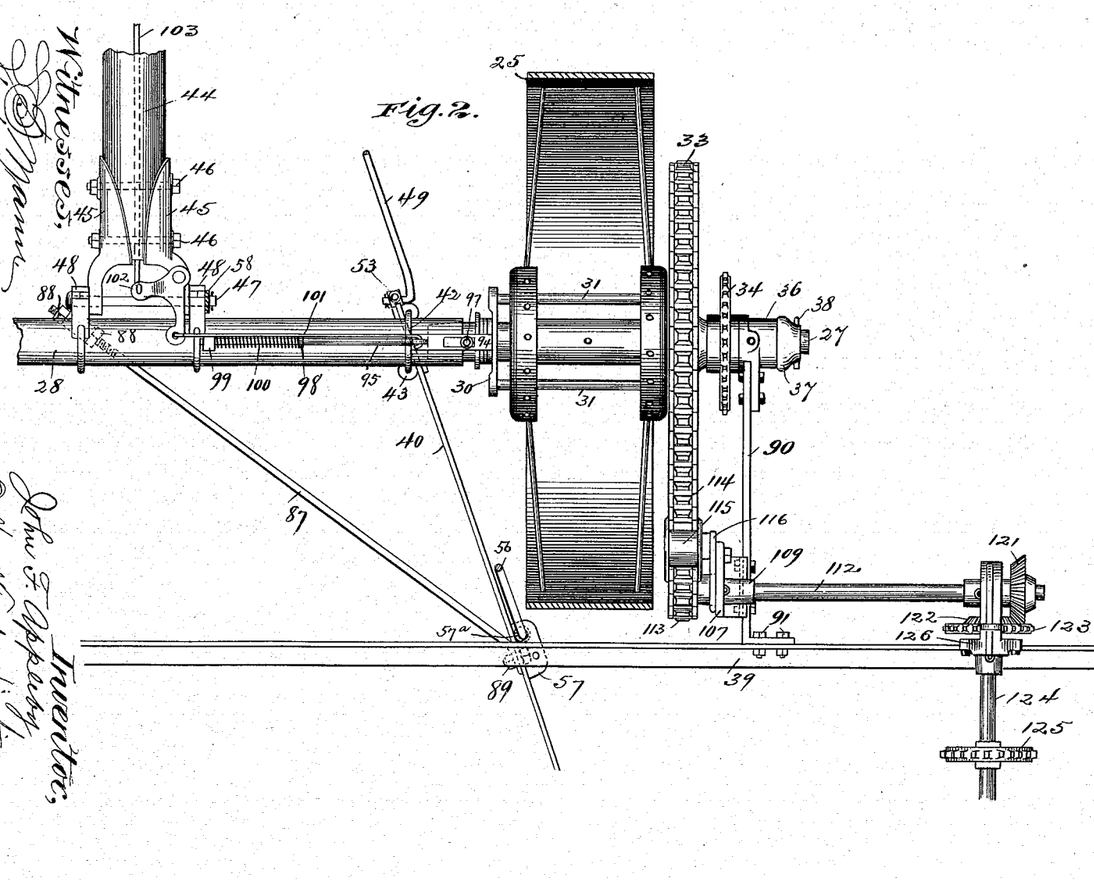
Fig. 2 is a broken plan view showing the rear part of the platform, the driving-wheel, the clutch mechanism, and the front connection of the push-pole.
Figure 11:
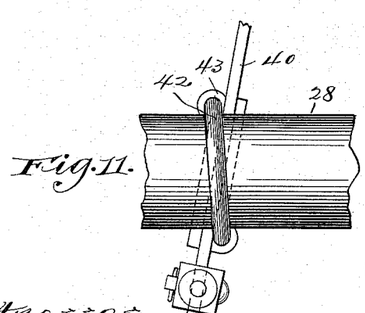
Figure 12:
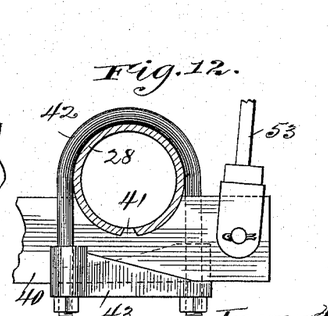
Figure 13:
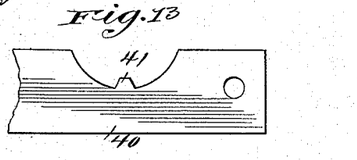

Referring to Figs. 1 and 2, 39 represents the platform-frame, which is carried by the support-bars or line-levers 40, which are connected to the sleeve in the manner shown in Figs. 11, 12, and 13, the rear ends of these bars 40 being cut out on their upper edges to conform to the periphery of the sleeve and having a notch or lug 41 entering an aperture in the sleeve, so as to prevent endwise movement of the support-bars with reference to the sleeve. The bars are clamped to the sleeve by means of a U-bolt 42 and the casting 43.

Figure 10:
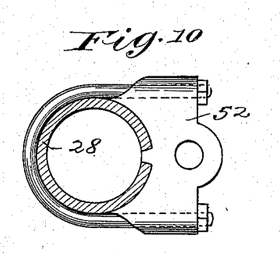

From the above description it will be seen that the platform is capable of being rocked around the axle, and in order to hold it at the proper elevation and to provide for adjusting it I employ a system of suspension and pull rods, an operating-lever, and counterbalancing-springs, whereby the platform is yieldingly suspended and is adapted to be rocked to vary the height of cut and is permitted to rise and fall automatically or to follow inequalities in the surface of the ground. The pull-rods extend to the driver's platform, which is in the rear of the machine and mounted upon the rear of the push-pole 44. Said push-pole is, by preference, a tubular beam and is hinged to the sleeve 28 in the manner shown in Fig. 2 by means of the hinge members 45, having their ends curved to embrace the push-pole and secured thereto by the through-bolts 46, the front ends of said hinge members being transversely apertured and connected by the pivot-bolt 47 to the hinge members 48, which are clamped to the sleeve 28 in the manner shown in Fig. 10. The push-pole has also the diagonal brace-rods 49, one of them having its forward end pivotally connected with the rear end of the support-bar 40, next to the drive-wheel, while its rear end is pivotally connected to a casting 50, (shown in Fig. 14,) which is clamped on the push-pole by means of the U-bolt 51. The other of said diagonal brace-rods is connected at its rear end to the casting 50, while its forward end is pivotally connected to a separate casting 52, Fig. 10.

Figure 8:
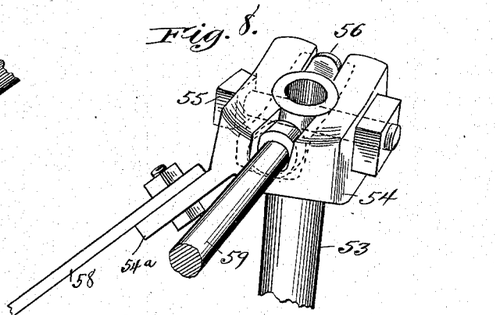
Figure 9:
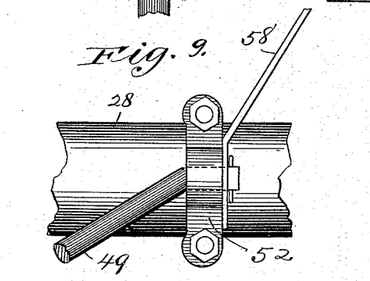

53 represents tubular standards which are pivotally connected at their lower ends to the support-bars 40, and their upper ends pass through vertical apertures in castings 54, Fig. 8, to which they are secured by the bolt 55. Said castings have seats or sockets provided in their upper surfaces to receive the suspension-rods 56, which extend diagonally downward to the rear edge of the platform 39, to which they are connected by means of the casting 57, Fig. 2. This casting is notched, as at 57ª, and the lower ends of rod 56 are headed to prevent their withdrawal. The blocks 54 have apertured lugs 54ª, to which the upper ends of the brace-bars 58 are bolted, the opposite end of one of said brace-bars being connected to the pivot-bolt 47, as seen in Fig. 2, and the lower end of the other being connected to the casting 52. The parts 53, 56, and 58 therefore form a triangular strut, two of the parts being connected to the tubular beam 28 and the members 56 being connected to the platform-frame.

Figure 7:
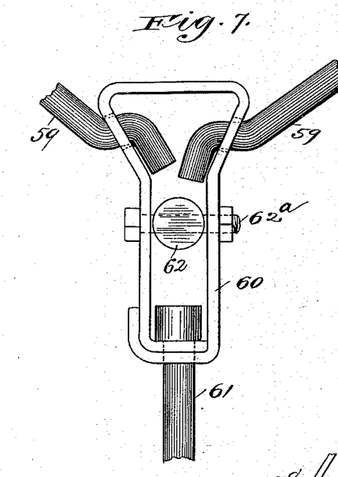
Figs. 7 to 14, inclusive, are detail views of sundry parts.

59 represents two diverging pull-rods whose forward ends are headed or offset, so as to enter sockets in the casting 54, Fig. 8, as indicated by the dotted lines, and said heads, as well as the heads of the suspension-rods 56, are dropped into their seats or sockets before the standard 53 is inserted through the vertical aperture of the block 54, and when said standard is inserted and secured by its bolt 55 the said several parts are all secured by the same bolt. The rear ends of the rods 59 are offset, as seen in Fig. 7, and before their forward ends are secured in place these offset ends are entered through lateral apertures in a frame 60, to the rear end of which is connected the main pull-rod 61.

Figure 14:
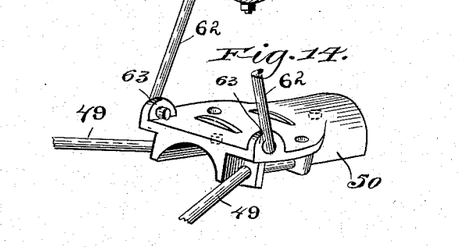
Figure 15:
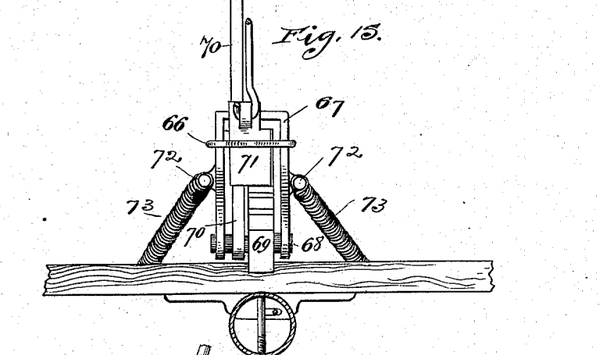
Figs. 15 and 16 are respectively a front and a side elevation showing the connections of the counterbalancing-springs and the latter view showing two positions.
Figure 16:
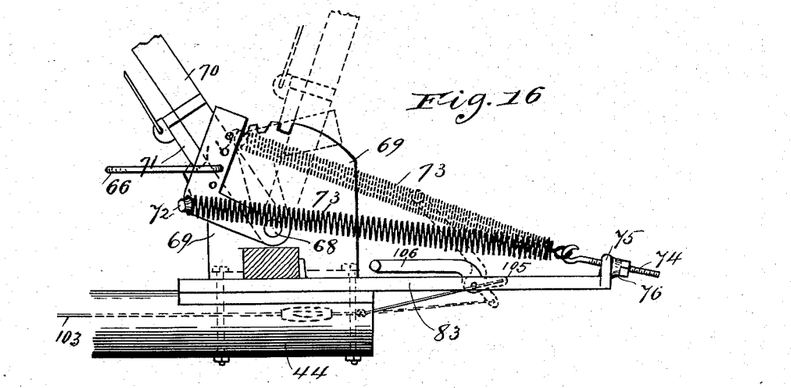

62 represents a swinging strut whose upper end is pivotally connected to the frame 60 by means of the pivot-bolt 62ª and whose lower end is forked, the furcations entering apertures of the lugs 63 in the casting 50, Fig. 14. The casting 50 may be secured against movement upon the pole by means of lugs entering apertures in the tube or in any other convenient manner. The main pull-rod 61 is provided with a turnbuckle 64, and the latter has a hook 65 taking into a bail 66, the ends of the bail being pivotally connected to a yoke 67, pivoted at its lower end on a bolt 68, which passes through a ratchet-standard 69 and through the lower end of the operating-lever 70. The lever has a spring-actuated pawl 71, which engages ratchet-teeth on the standard 69, and the yoke, as will be seen in Fig. 15, embraces the lever and standard and is arranged in the rear thereof, so that as the lever is swung back upon its pivot the yoke will be drawn back, thus exerting a pull on the pull-rod. The form of this yoke will be seen in Figs. 1, 15, and 16. Its sides are bent, and at the apices are studs 72, to which are hooked the counterbalance-springs 73, the rear ends of said springs having bolts 74, which pass through perforated lugs 75 on the platform and are provided with adjusting-nuts 76. It will be seen that the platform and the parts carried thereby are pivotally mounted on the axle and may be rocked thereon, either manually by the movement of the operating-lever or by the passing of the platform over obstructions, that the swinging strut, by reason of the divergence of its members, will prevent the lateral swaying of the pull-rods and cause them to operate in a line parallel to the pole, and that the platform and the parts mounted thereon are in part suspended or supported by means of the counterbalancing-springs. As it is contemplated that the platform shall be adjusted to different levels, the arrangement of the pivots of these counterbalancing-springs and the connections of the pull-rod therewith become matters of prime importance. The counterbalancing-springs are preferably large spiral springs whose coils are separated under tension, and the power of these springs will vary as they are extended. Hence I have so arranged them that their leverage is increased as the springs are extended and shortened as the springs contract. This will be understood by reference to Fig. 16, in which the full lines show the operating-lever well forward, the springs being practically horizontal and the yoke in such position that the leverage of the springs upon the yoke is long, while the dotted lines show the lever drawn back and the yoke swung upon its pivot in such position as to close the coils of the springs, while the leverage is shortened and the coils of the springs are contracted. The leverage of the pull-rod on the yoke varies correspondingly to the varying positions of the yoke. By this arrangement the effective power of the springs remains relatively the same in all positions of the platform. It is contemplated that the lever will be set in such position as to limit the downward movement of the platform, while the latter is free to rise and fall in passing obstructions, the springs always serving as a counterpoise to check the descent of the platform toward its normal position and practically balancing its weight during operation, while rendering its adjustment by means of the operating-lever easy. The turnbuckle affords an independent means for setting the machine to cut any desired height of stubble.

The steering mechanism comprises the caster-wheel 78, whose yoke carries the standard 79, and the latter is provided with the sleeved bracket 80, on the stem of which is mounted a rudder 81, which is adapted to turn freely on the stem. When turned in a horizontal position, it affords a seat for the driver, and when arranged vertically the driver stands astride it and effects the movement of the tiller-wheel by pressure on the rudder. I have shown provision for automatically guiding the draft-animals in turning corners in such manner as to assist in steering the machine, and this provision consists in a line-bar 82, which is secured on top of the standard of the steer-wheel and to which the lines may be secured. A movement of the standard will, when the lines are properly connected, guide the team so as to assist the operator in turning a corner. A platform 83 is preferably composed of a single casting and is made somewhat massive, so as to secure a proper weight to counterbalance the heavy weight in front of the axle. A tool-box 84 is secured to the under side of the platform by a single pivot-bolt 85, and the box may be swung laterally from under the platform to permit access to its contents, and when returned into line with the rear edge of the platform it is secured by the pivoted latch 86.

In order to bring the platform to proper alinement with the axle, I have employed the rod 87, whose rear end passes through an apertured lug on one of the hinge members 48 and is provided with adjusting-nuts 88, the forward end of said rod being bolted to the support-bar 40 by a single bolt 89, which passes through the casting 57, the casting being secured to the rear bar of the platform 39, as seen in Fig. 2. When thus clamped, the lower end of suspension-rod 56 is secured against withdrawal. A thrust-bar 90 is bolted at its rear end to a lug on the sleeve 36 and its forward end is bent at right angles to its body and bolted to the platform-bar by the bolts 91. This thrust-bar 90 and the support-bar 40, it will be seen, embrace the main driving-wheel, while the alinement-rod 87 affords means for bringing all the parts into proper alinement.

The foregoing describes the frame of the machine, the manner of mounting it upon the driving-wheels, and the means for adjusting the platform and for guiding or steering the machine.

Returning now to the cutting and binding mechanism, the platform 39 will be provided with the usual platform-belt and vibrating sickle. (Not necessary to be shown.) At one end of the platform is arranged the binder mechanism, which, as a whole, is marked 92, and which may be of any approved type.

93 represents the reel, which is driven from the gear 34. The main driving-gear 33 is put into operation by the shifting of the clutch-sleeve carrying the bolts 31. The clutch is operated by the shipper-lever, which is constructed in two parts 94 95, the part 94 having its end turned down to enter the groove of the hub 30, and it is slotted vertically for the passage of a hollow pipe-section 96, which is made to serve as an oiler, the lower end of said pipe-section being exteriorly threaded and turned into a threaded aperture in the sleeve 29. A washer is placed on top of the member 94 of the shipping-lever and a threaded-cap 97 holds the washer and thereby the shipper-lever in place. The hollow of the pipe being filled with oil, the lubricant is conveyed to the bearings in the axle. The member 95 of the shipping-lever is carried parallel to the axle and is provided with a collar 98 and passes through a lug 99 on the casting 48. A spring 100 normally thrusts the shipping-lever toward the drive-wheel, thus maintaining the gear 33 in clutch. A rod 101 is connected to the member 94 at one end and at the other to a bell-crank 102, pivoted on one of the hinge members 45. Another rod 103 is connected to the other arm of the bell-crank and is extended through the hollow of the push-pole back to the driver's platform, where it is connected to the rearwardly-extending arm 105 of the foot-treadle 106, pivoted on the platform. When the foot-treadle is depressed, the pivotal connection of the rod 105 is raised above the pivot of the treadle, thus pulling on the rod 103 and, through the bell-crank and the rod 101, drawing back the clutch-hub against the tension of the spring, and the action of the spring, whose thrust is toward the drive-wheel, tends to hold the clutch out of engagement until the front end of the treadle is raised again and its arm 105 depressed below the pivot, whereupon the spring will thrust the clutch into engagement and so maintain it. The clutch mechanism is therefore controlled by the driver at the platform, and it is maintained both in clutch and out under the thrust of the same spring.

Figures 3, 17, 18, 19, 20:
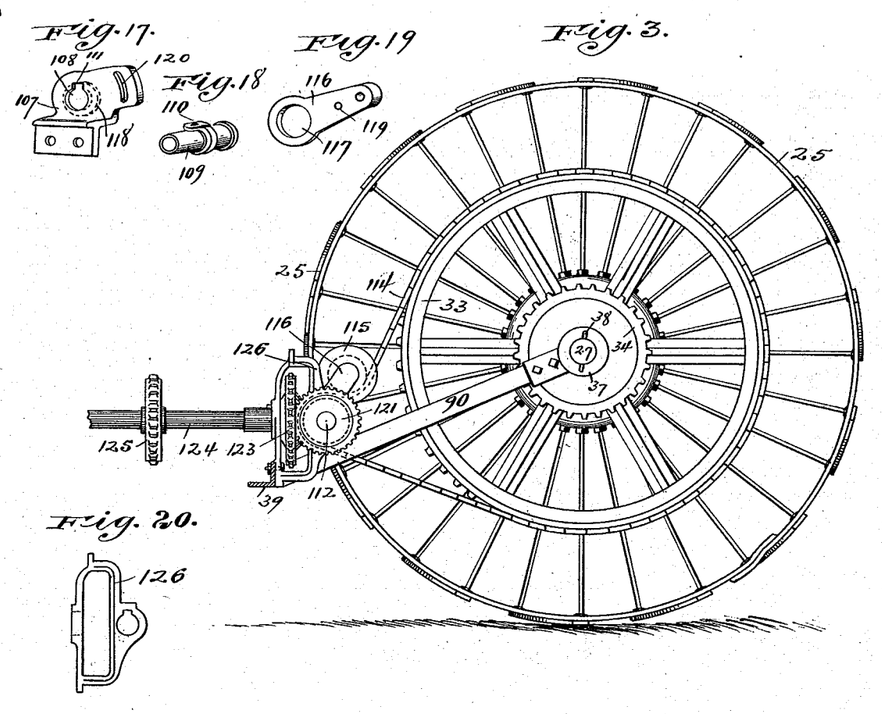
Fig. 3 is a side elevation of the principal parts shown in Fig. 2.
Figs. 17 to 20, inclusive, are details of certain parts of the gear-frames.

The gearing for driving the binder, the sickle, and the platform and elevator belts is all of very simple construction and arranged in a novel manner. Two gear-nests are employed, one being mounted upon the thrust-bar 90 and the other upon the platform-bar upon frames which are particularly illustrated in Figs. 17 to 20, inclusive. The first-three-named figures show the castings, which are mounted upon the thrust-bar 90 and comprise a bracket 107, having a depending perforated web or flange which is bolted flatwise upon the bar 90. The body of this casting has a transverse aperture 108 to receive the sleeve-bearing 109, (shown in Fig. 18,) said bearing being prevented from rotation by the interlocking engagement of a web 110 thereon with an angular recess 111, formed in the wall of the aperture 108. The bearing 109 receives the inner end of shaft 112, which is mounted parallel to the platform and carries on its inner end a pinion 113, over which the chain belt 114, driven by the gear-wheel 33, is passed. An idler 115 is mounted upon an arm 116, which has an eye 117 to fit over a hub 118 on the side of the casting 107 concentric to the aperture 108, and the bracket-arm 117 is also provided with a transverse aperture 119, through which an adjusting-bolt passes, said bolt passing also through a slot 120 in an extended lug of the casting 107. This idler furnishes means for taking up the slack of the driving-belt and keeping it under proper tension and can be adjusted as occasion requires. The shaft 112 carries also at its outer end the bevel-gear 121, enmeshing with a similar gear 122, which is formed integral with a sprocket 123, mounted upon the shaft 124, which is the main driving-shaft for the binder, the sickle, and the platform-belts. The elevator-belts of the binder are driven from the sprocket 123, the binder mechanism is driven from the sprocket 125 on shaft 124, and the sickle is or may be driven from the same shaft. The gears 121, 122, and 123 are supported in the gear-frame 126, (shown in Fig. 20,) said frame being of elbow form, as shown in side elevation in Fig. 3, and bolted to the rear bar of the platform 39, the bearing for the outer end of the shaft 112, which is of similar construction to the bearing for its inner end, entering the aperture 127 in the frame 126. It will be seen that the gearing is positive and, while it is supported on frames that are rigidly connected with the platform, is capable of rocking with said platform in a curved line concentric to the axle, and thus the movements of the platform, either in adjusting or in operation, do not change or disturb the proper relations of the various parts of the driving mechanism. All of the moving parts which are connected with the platform rock about the axle, and the push-pole and its brace-rods have their joints in line and so close to the axle that the slight vibrating movement which they make in adjusting the platform does not interfere with the proper action of the other parts of the mechanism. The counterbalancing-springs and their operating mechanism are located at the rear of the machine, so that the vibrations of the springs during adjustment is slight and the equal tension of the springs is at all times preserved. By employing large counterbalancing-springs and varying their leverage to compensate for the extension of their coils and employing them in conjunction with a peculiar system of pull-rods and suspension-rods, which I have above described, enables me to support the weight of the binder upon the platform in a practical manner, which has not heretofore been attained.

While I have set forth above the preferred construction of each of the several mechanisms entering into this harvester, it is obvious that some of the structural details may be changed and that some of them may be employed in machines in which others of said features are omitted.

Without limiting myself, therefore, to precise details of construction or to the association of all of said novel features in the same machine, I claim—

1. In a harvester of the class described, the combination with carrying-wheels and their axle, of a tubular beam sleeved over the axle and adapted to rock thereon, a push-pole having a hinged connection at its forward end to the sleeve, a grain-platform rigidly connected with the tubular beam and adapted to rock therewith, standards connected to the sleeve, suspension-rods connected to the upper ends of the standards and to the platform, diverging pull-rods also connected to the upper ends of the standards, a pull-rod connected to the diverging pull-rods, a counterbalancing spring or springs connected with the rear ends of the pull-rod, and a stop to limit the extension of the springs, substantially as described.

2. In a harvester of the class described the combination with the carrying-wheels and their axle of a tubular beam sleeved over the axle, a platform connected with the beam, a push-pole having its forward end hinged to the beam, standards mounted on the latter, suspension-rods connected to the upper ends of the standards and to the platform, pull-rods connected to the standards and converging rearwardly, a swinging strut having diverging legs pivoted to the push-pole and to said pull-rods and a connection from the swinging strut to the driver's station, substantially as described.

3. In a harvester of the class described, the combination with the carrying-wheels and their axle, of a tubular beam sleeved upon the axle, a platform rigidly connected to the tubular beam, a push-pole and diagonal braces therefor, the forward ends of said pole and braces being hinged to the tubular beam and said hinges being substantially in alinement with each other and eccentric to the axis of the beam, standards mounted on the beam, suspension-rods connected to the upper ends of the standards and to the platform, pull-rods connected to the standards and converging rearwardly, a swinging strut pivotally mounted on the push-pole and to which the pull-rods are also pivotally connected and a connection from the swinging strut to the driver's station, substantially as described.

4. In a harvester of the class described, the combination with the carrying-wheels and their axle, of a tubular beam sleeved over the axle, a platform rigidly connected thereto and means for rocking the platform comprising suspension-rods connected to the platform in front of the axle, and pull-rods pivotally connected to the suspension-rods and extending rearwardly to the driver's station, and a counterbalancing spring or springs connected with the pull-rod and an operating-lever for manually tilting the platform, substantially as described.

5. In a machine of the class described, the combination with a platform adapted to rock upon the axle, suspension-rods connected with the platform in front of the axle, pull-rods pivotally connected therewith and a pull-rod connected to the first-named pull-rods and extending to the driver's station, a pivoted yoke to which the pull-rod is connected, counterbalance-springs pivotally connected to the yoke with means for swinging the yoke upon its pivot, the said several pivots being so arranged that as the springs are extended their leverage is shortened and vice versa, substantially as described.

6. In a machine of the class described, the combination with a steering-wheel and its standard, of a rudder having a swivel connection with the standard whereby it may be turned to afford a seat for the driver, substantially as described.

7. In a machine of the class described, the combination with a steering-wheel and its standard, of a line-bar secured to the top of the standard and turning therewith whereby the team may be guided by the turning of said standard to assist the steering, substantially as described.

8. In a harvester of the class described, the combination with the axle, of a sleeve mounted thereon, a clutch mechanism sliding over the sleeve, a clutch-shifting bar for operating the clutch member, and a pipe-section extending through a slot in the shifting-bar and threaded into the sleeve of the axle and having a longitudinal bore to provide a lubricant-chamber, substantially as described.

9. In a harvester of the class described, the combination with a tilting mechanism comprising a main pull-rod, a swinging strut, two forwardly-extending diverging pull-rods and a frame connecting said rods and swinging strut, the pull-rods having their rear ends bent or offset to adapt them to enter lateral apertures in the frame, substantially as described.

10. In a harvester of the class described, the combination with the carrying-wheels and their axle, of a tubular beam sleeved over the axle, a platform rigidly connected to said tubular beam and a tilting mechanism comprising a main pull-rod and two diverging pull-rods, a swinging strut pivotally connected to said diverging and main pull-rods and to the push-pole, a standard pivotally connected to the tubular beam, suspension-rods pivotally connected to the platform and castings carried by the upper ends of the standards and in which the forward ends of the diverging pull-rods and the rear ends of the suspension-rods are pivotally mounted, substantially as described.

JOHN F. APPLEBY.

Witnesses:
N. M. BOND,
FREDERICK C. GOODWIN.